A. J. BATES.
SHEARING MACHINE.
APPLICATION FILED OCT. 12, 1917.

1,286,203.

Patented Dec. 3, 1918.
10 SHEETS—SHEET 1.

Fig. 1

Inventor
Albert J. Bates
By
Attys.

A. J. BATES.
SHEARING MACHINE.
APPLICATION FILED OCT. 12, 1917.

1,286,203.

Patented Dec. 3, 1918.
10 SHEETS—SHEET 2.

A. J. BATES.
SHEARING MACHINE.
APPLICATION FILED OCT. 12, 1917.

1,286,203.

Patented Dec. 3, 1918.
10 SHEETS—SHEET 6.

Inventor
Albert J. Bates
By Wm H Bell Atty

A. J. BATES.
SHEARING MACHINE.
APPLICATION FILED OCT. 12, 1917.

1,286,203.

Patented Dec. 3, 1918.
10 SHEETS—SHEET 10.

Inventor
Albert J. Bates
By

UNITED STATES PATENT OFFICE.

ALBERT J. BATES, OF CHICAGO, ILLINOIS, ASSIGNOR TO BATES EXPANDED STEEL TRUSS CO., OF WILMINGTON, DELAWARE, A CORPORATION OF DELAWARE.

SHEARING-MACHINE.

1,286,203.  Specification of Letters Patent.  Patented Dec. 3, 1918.

Application filed October 12, 1917. Serial No. 196,307.

*To all whom it may concern:*

Be it known that I, ALBERT J. BATES, a citizen of the United States, residing at Chicago, in the county of Cook and State of Illinois, have invented certain new and useful Improvements in Shearing-Machines, of which the following is a specification.

This invention relates to the art of metal working and more particularly to a machine for shearing metal, such as structural steel members which are to be subsequently expanded to provide integral truss structures.

The primary object of my invention is the provision of a rotary shear which is substantial, powerful, continuous and rapid in operation and which is well adapted for shearing cold metal of considerable thickness.

A further object of my invention is the provision of means whereby a plurality of longitudinally spaced slits may be made in the metal without injury thereto and for replacing metal displaced during the shearing operation in its original plane.

Another object of my invention is to provide means for shearing structural members to produce a plurality of longitudinally and laterally spaced slits of progressively varying lengths so that when expanded the truss elements thus formed will vary in length and the member in its final form will be longitudinally tapered.

Further objects and advantages of my invention reside in the provision of simple and effective means to continually drive the shear elements from a source of power, to establish a driving connection from the source of power to the feed mechanism at will, to automatically synchronize the shear members with the feed mechanism prior to each actuation of the latter, to automatically break the driving connection at intervals and to prevent the establishment of a driving connection under certain conditions.

Other objects and advantages of my invention will be apparent as it is better understood by reference to the following specification when read in connection with the accompanying drawing, illustrating the preferred embodiment thereof, in which—

Fig. 4 is a vertical section on the line 4—4 of Fig. 3;

Fig. 8 is a side elevation illustrating the controlling means on a somewhat smaller scale;

Referring to the drawing 5 indicates a foundation preferably of concrete providing a pit, beneath the floor, in which a portion of the structure is located so that the operative parts are disposed at a convenient level above the floor.

A shaft 7 is journaled in a bearing supported on the foundation 5 at one side of the pit and in a bearing 9 in a frame 10 supported on the foundation and spanning the pit. A shaft 11 is journaled in a bearing 12 on the frame 10 above the bearing 9 and in a bearing 13 on a frame 14 supported on the foundation 5. The shafts 7 and 11 carry the upper and lower rotary shear members 15 and 16 having shear elements on their peripheries as will presently be described.

The rotary shear members 15 and 16 are also provided on their peripheries with inter-engaging gear teeth 17 whereby they are caused to rotate at the same peripheral speed when one of the rotary shear members is driven from a source of power.

Figure 1:
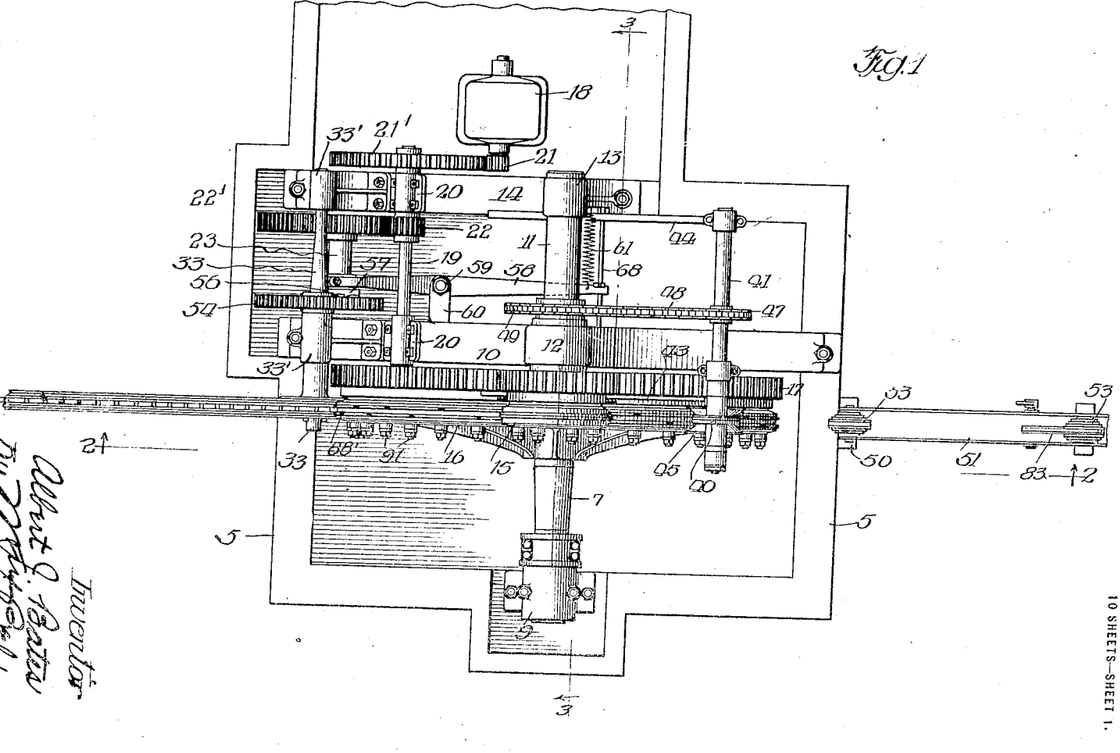
Figure 1 is a plan view of my invention.

A source of power, such for example as the motor 18 (Fig. 1), is mounted on the foundation 5 adjacent the shear and drives a shaft 19, journaled in suitable bearings 20 on the frames 10 and 14, through a pinion 21 and a gear 21'. A pinion 22 on shaft 19 drives gear 22' on a shaft 23. A pinion 24 (Fig. 4) on shaft 23 meshes with the teeth 17 on the lower shear member 16 to drive the latter continuously when the machine is in operation. This is desirable because of the great weight and consequent inertia of the shear members, more power being absorbed in starting the shear members than is necessary to maintain them in rotation between the intermittent shearing operations.

Figure 11:
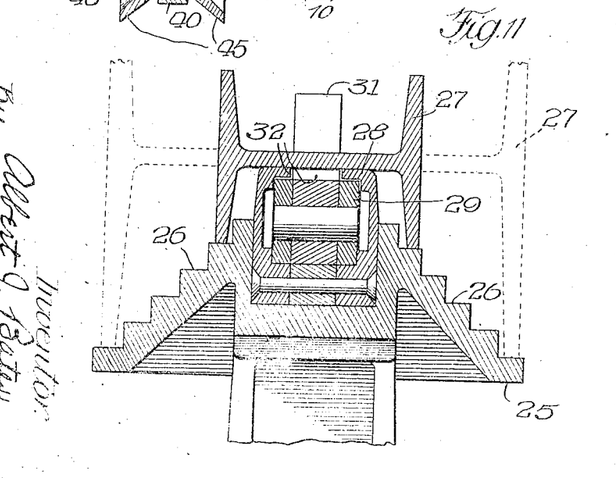
Fig. 11 is an enlarged vertical section through the feed mechanism.

The mechanism for feeding material to be sheared to the rotary shear members comprises an elongated support 25 (Figs. 4 and 11) having stepped wings 26 at either side thereof to support structural members 27 of different dimensions. A housing 28 is mounted on the support 25 and incloses a chain 29 which passes about a driven sprocket 30, adjacent the shear members, and a corresponding idle sprocket (not shown) at the opposite end of the support 25. The chain 29 is provided with two lugs 31 spaced apart thereon and projecting through a slot 32 in the housing 28 to engage the end of the structural member 27 and advance it along the support 25.

The sprocket 30 is loosely supported on a shaft 33, mounted in bearings 33' on the frames 10 and 14 and is operatively connected to the shaft 33 by a lost-motion connection which compensates for any slight differences in the speed of the shear elements due to variations in the thickness of the material sheared. The lost-motion connection comprises a member 34 (Fig. 4) keyed to the shaft 33 and provided with flanges 35 between which and corresponding flanges 36 on the sprocket 30, springs 37 are disposed. Bolts 38 connecting the flanges 35 and 36 prevent relative movement thereof in one direction. As will be readily understood from the foregoing description, any retardation of the chain 29 owing to decreased peripheral speed of the shear members will result in compression of the springs and no injury to the mechanism can result.

Figure 2:
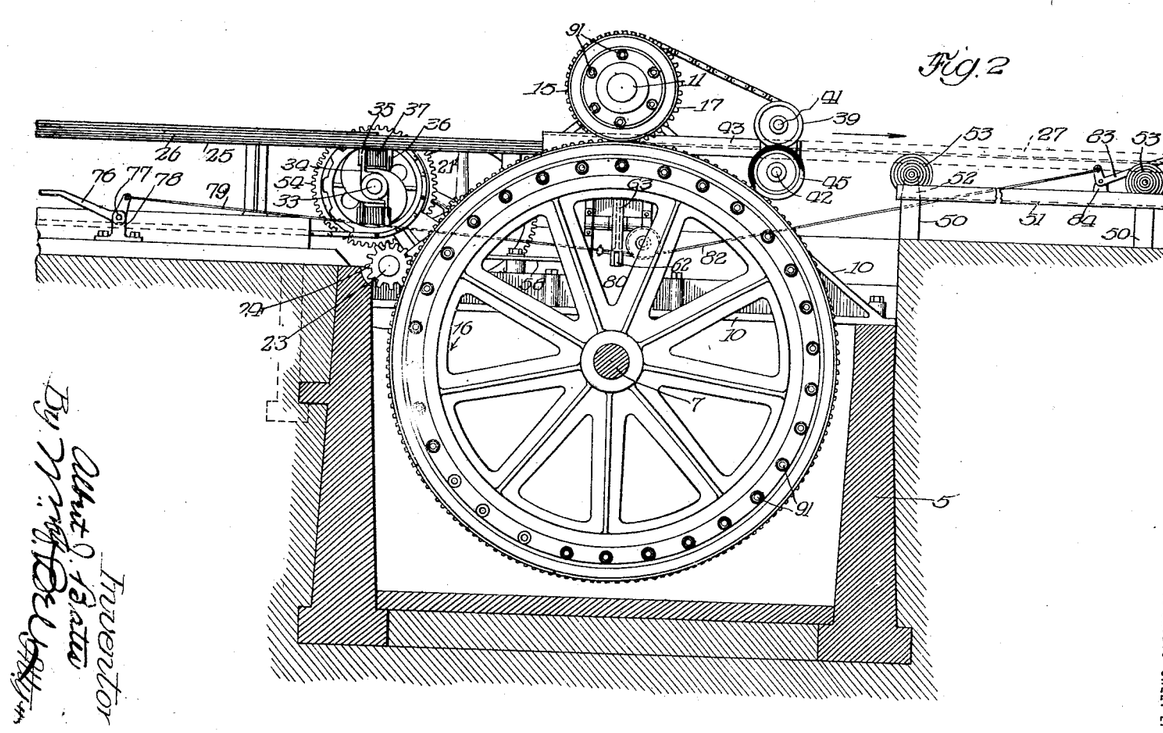
Fig. 2 is a vertical section on the line 2—2 of Fig. 1.
Figure 9:
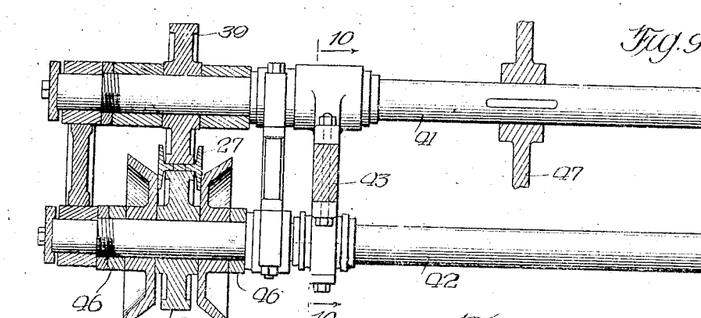
Fig. 9 is an enlarged vertical section through the rolls for returning the metal distorted during the shearing operation to its normal plane.
Figure 10:
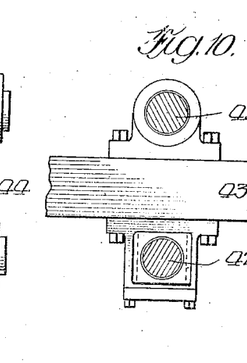
Fig. 10 is a section on the line 10—10 of Fig. 9.
Figure 12:
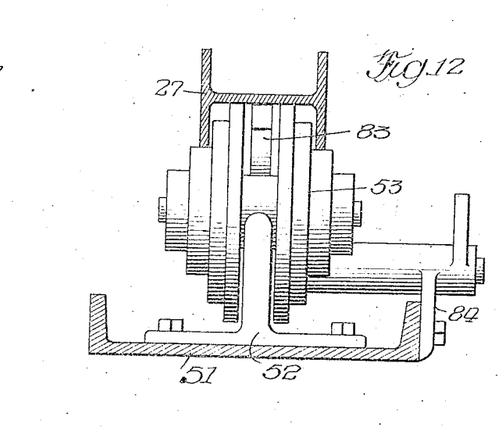
Fig. 12 is an enlarged vertical section through the receiving table.

From the shear members the structural member 27 is delivered to the rolls 39 and 40 (Figs. 4 and 9) which return the metal displaced during the shearing operation to its original plane. The rolls 39 and 40 are supported on shafts 41 and 42 journaled in bearings 43 and 44 on the frames 10 and 14. On either side of the roll 40 flange guides 45 are supported on the shaft 42 and are adapted to coöperate with the flanges of the sheared structural member to maintain them in proper relative position. Collars 46 on the shaft 42 provide for adjustment of the flange guides 45 in accordance with the depth of the flanged structural members which are passed through the machine. A sprocket 47 on the shaft 41 is driven by a chain 48 which passes around a sprocket 49 on the shaft 11. The sprockets 47 and 49 are proportioned so that the peripheral speed of the rolls 39 and 40 is equal to the peripheral speed of the rotary shear members. The rolls 39 and 40 are continuously driven when the machine is in operation. A table is arranged adjacent the rolls 39 and 40 and is adapted to receive the sheared structural members therefrom. The table comprises uprights 50 (Fig. 2), a horizontal channel member 51 (Fig. 12) and brackets 52 supporting rollers 53. The rollers 53 are stepped to receive structural members of different dimensions.

Figure 3:
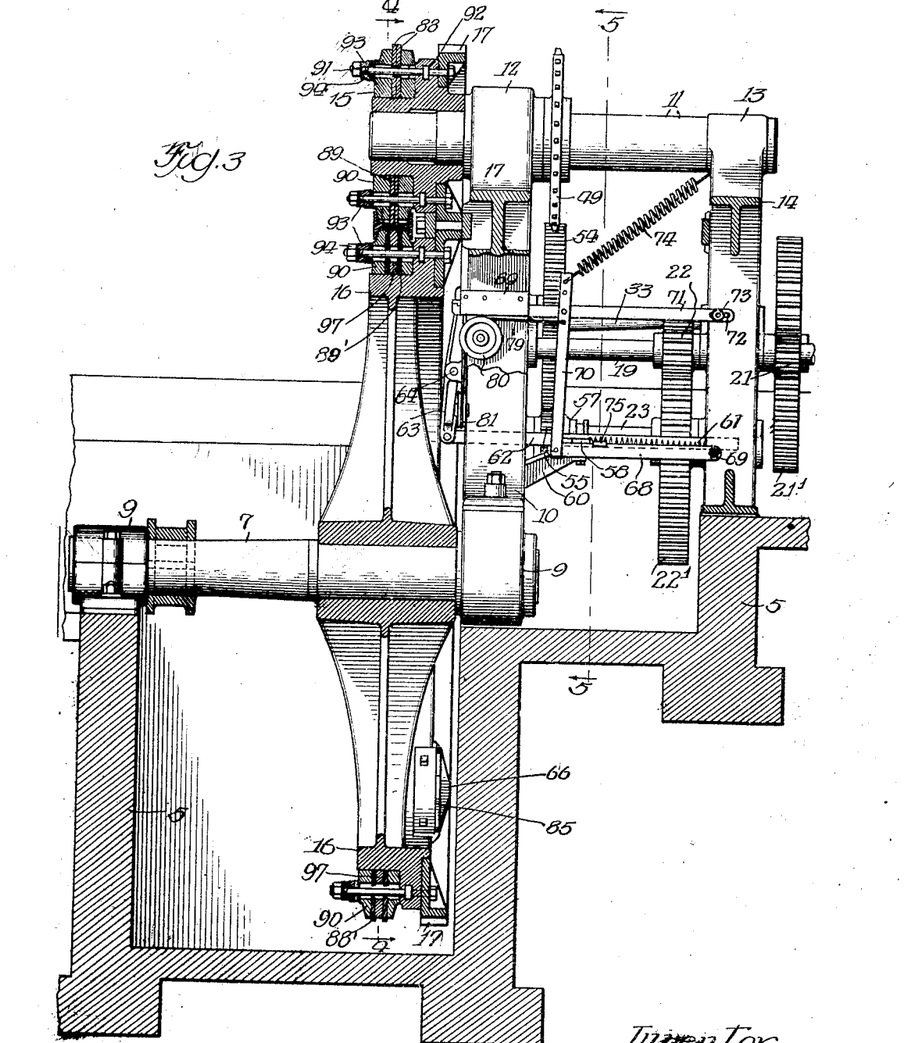
Fig. 3 is an enlarged vertical section on the line 3—3 of Fig. 1.
Figure 5:
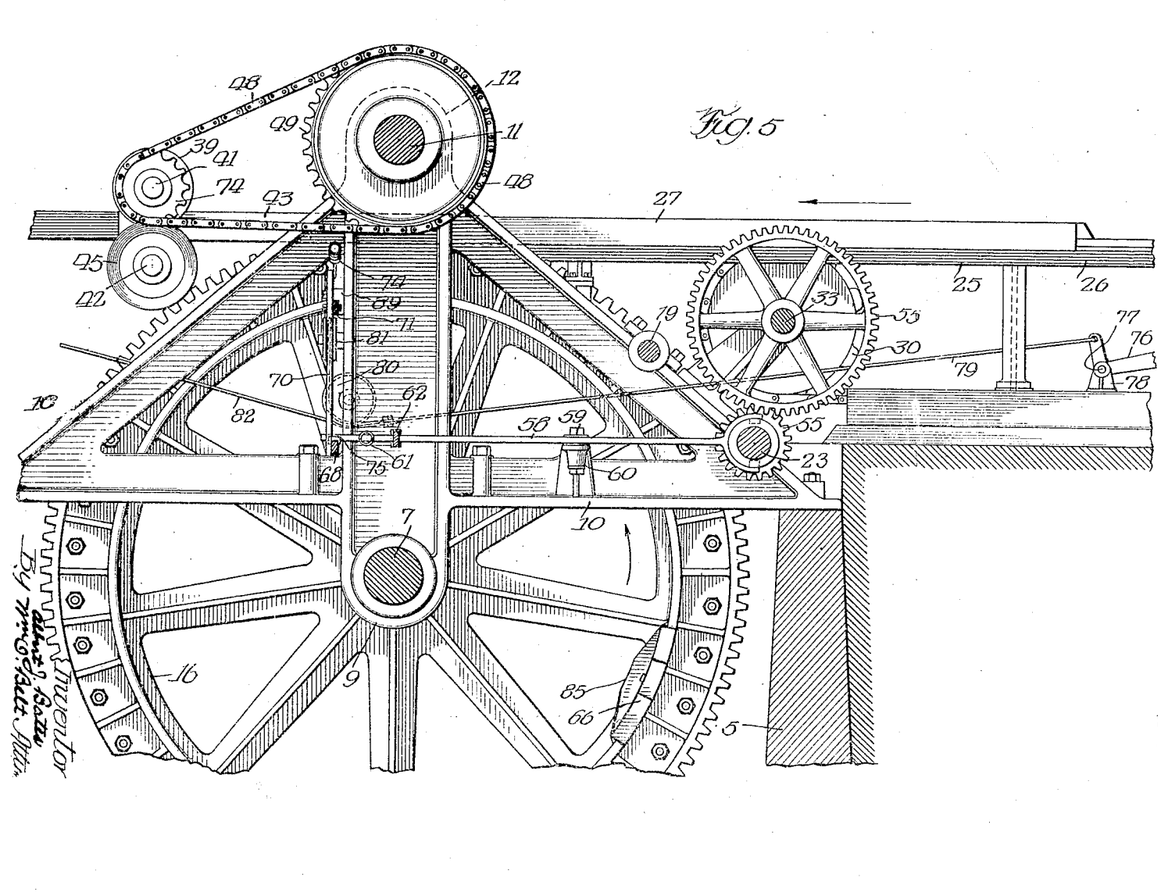
Fig. 5 is a vertical section on the line 5—5 of Fig. 3.

The shaft 33 is intermittently actuated to advance the chain 29 at a speed corresponding to the peripheral speed of the shear members by the following mechanism. A gear 54 is fast to the shaft 33 and meshes with a pinion 55 (Fig. 3) loose on the shaft 23 and having clutch teeth 56. A clutch 57 having coöperating teeth is splined to the shaft 23 and is movable into and out of engagement with the clutch teeth 56 by means of a clutch lever 58 (Fig. 1) connected at one end to the clutch 57 and pivoted at 59 on a bracket 60 secured to the frame 10. A spring 61 secured to the opposite end of the clutch lever and to the frame 14 tends to hold the clutch 57 in operative position to lock the pinion 55 to the shaft 23.

Figure 6:
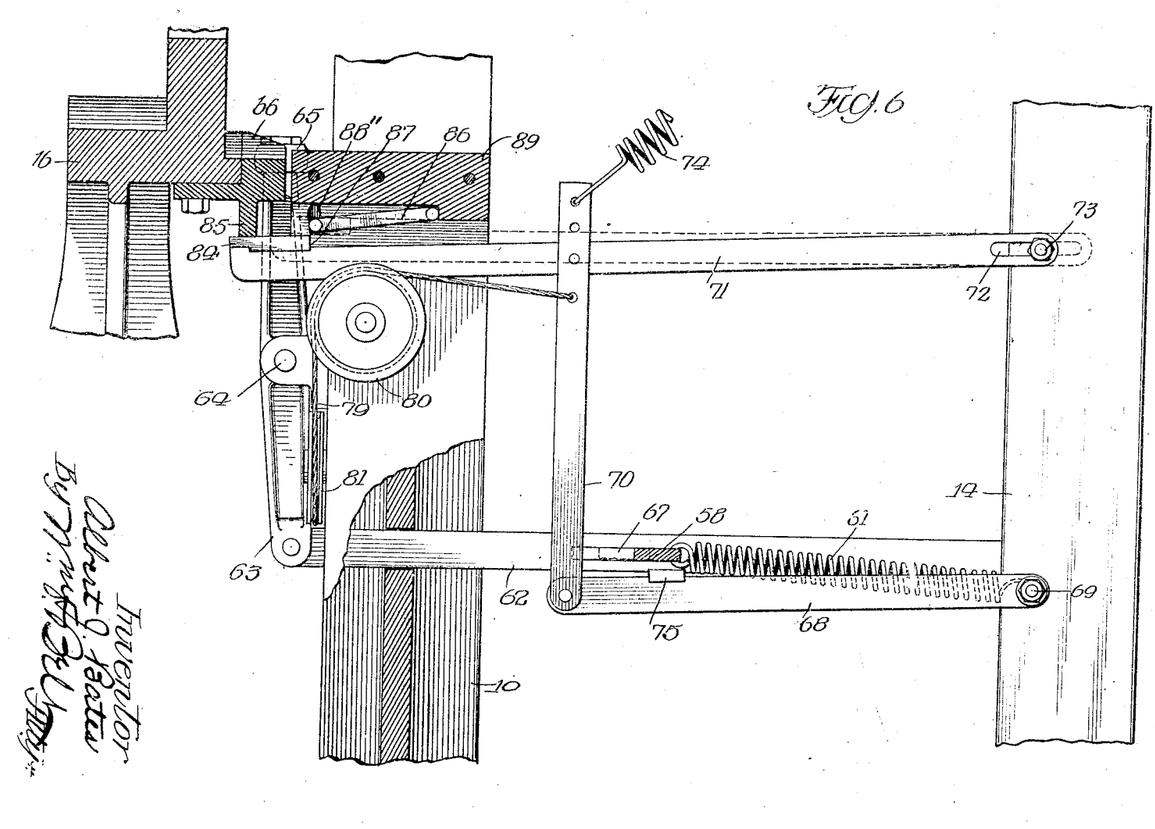
Fig. 6 is an enlarged detail in section illustrating the means for controlling the feed mechanism.
Figures 6, 7:
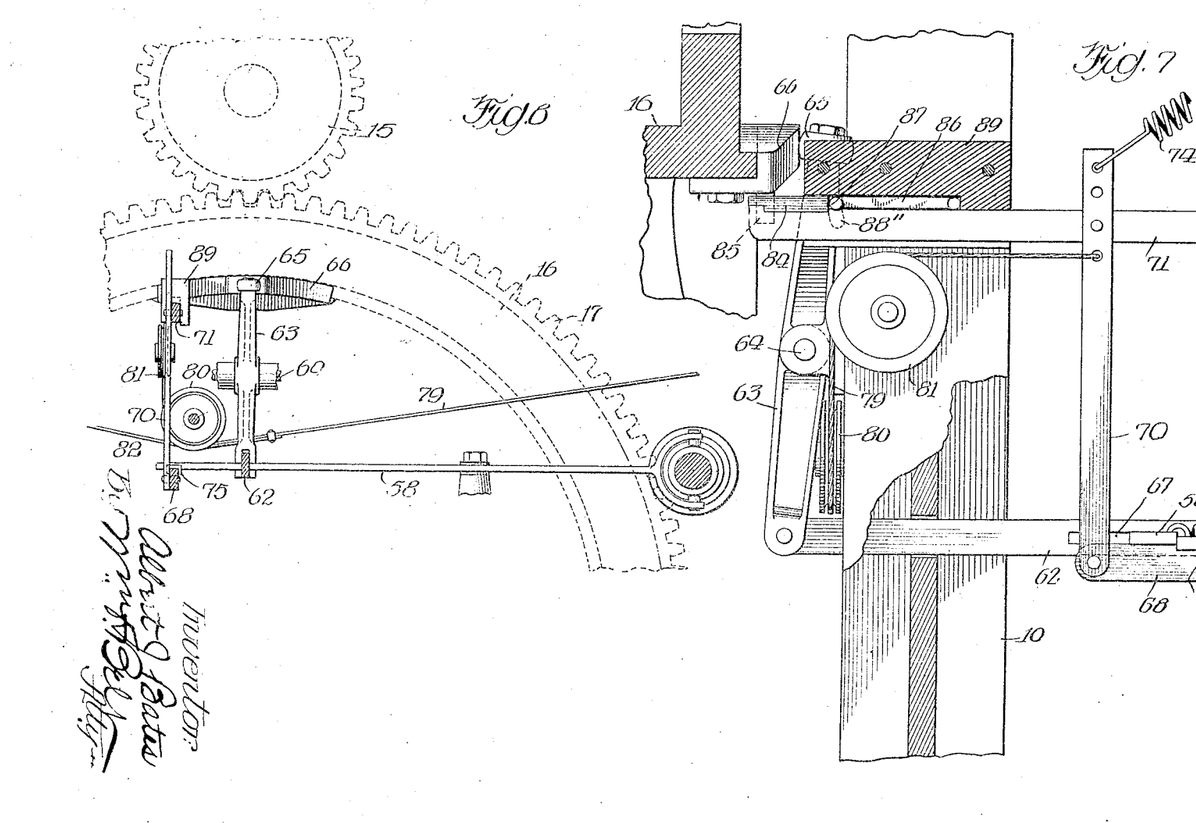
Fig. 7 is a similar view illustrating a different position of the parts.

To automatically disengage the clutch 57 from the clutch teeth 56 at the conclusion of each shearing operation I provide a bar 62 (Figs. 6, 7 and 8) which is slidably mounted in openings in the frames 10 and 14. One end of the bar 62 is connected to a lever 63 pivoted at 64 on the frame 10 and carries a roller 65 in the path of a cam 66 on the side of the shear member 16. The bar 62 is provided with a slot 67 embracing the lever 58. The cam 66 is arranged on the shear member 16 so that it engages the roller 65 as the shearing operation is completed and swings the lever 63 to the position indicated in Fig. 7. The lever 58 is consequently swung on its pivot to the dotted position in Fig. 6 to withdraw the clutch 57, permitting the feed mechanism to come to rest. A latch 68 is pivoted at 69 on the frame 14 and is connected by a link 70 to a bar 71 slotted at 72 to engage a bolt 73 on the frame 14 so that the bar is permitted to slide longitudinally on the bolt and to swing about the bolt as a pivot. A spring 74, secured to the end of the link 70 and to the frame 14, tends to draw the link upwardly and toward the frame 14. Thus when the lever 58 is moved to the position indicated in Fig. 7 the spring 74 will cause a hardened steel wear block 75 on the latch 68 to engage behind the lever 58 to hold the clutch 57 in inoperative position.

To again start the feeding mechanism, I provide a foot pedal 76 (Figs. 2 and 4) pivoted at 77 on a suitable bracket 78 adjacent the feed mechanism and connected by a cable 79 which is guided by sheaves 80 and 81 (Figs. 3 and 8) to the link 70. A cable 82 connects the cable 79 (Fig. 2) to a bell-crank lever 83 pivoted in a bracket 84 on the channel member 51. The free arm of the bell-crank lever 83 is arranged in the path of the structural members 27 on the supporting rollers 53 and when a structural member is disposed thereon the bell-crank lever 83 is swung about its pivot and through its connecting cable 82 prevents actuation of the foot pedal 76. Thus the operator is prevented from starting the feeding mechanism until the sheared structural member has been removed from the machine.

It is essential that the shear members and feed mechanism be synchronized during the shearing operation in order that the slits may be properly spaced with respect to the ends of the structural member. The shear members rotate continuously while the feed mechanism is actuated intermittently. To save the time of the operator, who must sometimes travel a considerable distance between the machine and the supply of structural members, and relieve him of the responsibility of starting the feed mechanism at the proper time the mechanism controlled by the foot pedal 76 is arranged so that it does not release the clutch lever 58 as soon as the foot pedal is depressed. Depression of the foot pedal, however, initiates the action which automatically starts the feed mechanism when the shear members reach a predetermined position.

As previously stated the cable 79 connects the foot pedal 76 and link 70. When the foot pedal is depressed the link 70 and bar 71 are moved to the left, carrying the end of the bar 71 to which a hardened steel wear block 84 is secured into the path of a cam 85 on the shear member 16 adjacent the cam 66. The bar 71 is held in this position by a latch 86 which drops behind a shoulder 87 formed at the end of the wear block 84. The movement of the latch 86 is limited by a slot 88'' formed in a plate 89 secured to the frame 10 in which the end of the latch 86 is disposed. When the cam 85 engages the wear block 84 the bar 71 is depressed. The latch 86 is similarly depressed through the connecting link 70 until the wear block 75 disengages the clutch lever 58 which is actuated by the spring 61 to move the clutch 57 to operative position and start the feed mechanism. When the bar 71 rides over the highest portion of the cam 85 the shoulder 87 disengages the latch 86 and the spring 74 moves the bar 71 to the position indicated in dotted lines in Fig. 6. The machine is now in operation until at the conclusion of a single revolution of the shear member 16 the cam 66 again engages the roller 65 and actuates the mechanism to disengage the clutch 57.

Figure 13:
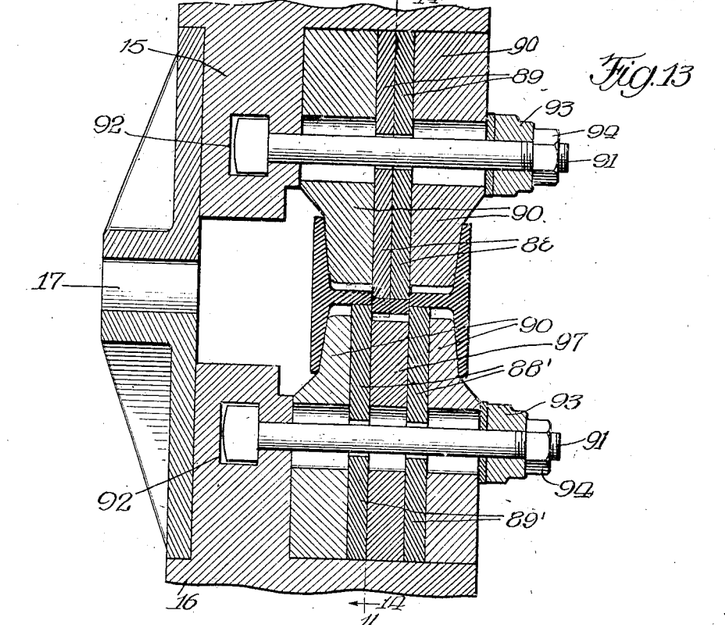
Fig. 13 is an enlarged sectional view illustrating the manner in which the shear elements are secured to the shear members.
Figure 14:
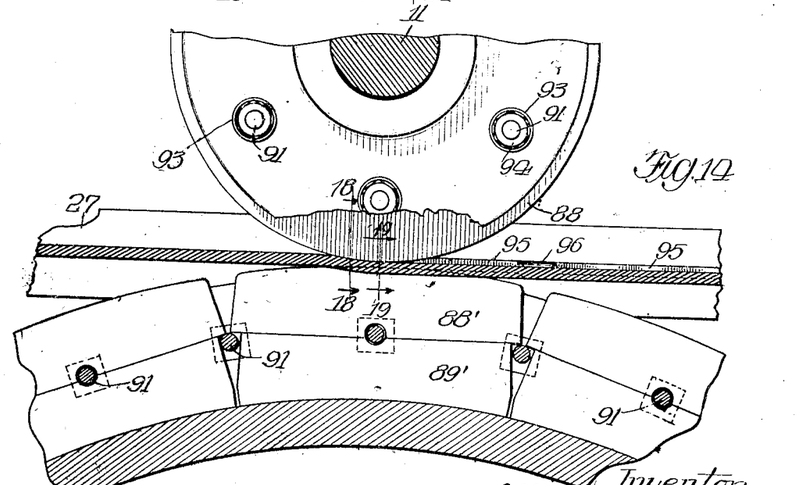
Fig. 14 is a section on the line 14—14 of Fig. 13.

The rims of the rotary shear members 15 and 16 are rabbeted (Fig. 13) to provide a support for the shear elements. The shear elements 88 and 88' on the shear members 15 and 16, respectively, are supported on thrust plates 89 and 89' which engage the peripheries of the rotary shear members. The shear elements and thrust plates are held in position between the clamping plates 90 and are securely fastened to the peripheries of the rotary shear members by bolts 91, the heads of which engage circular slots 92 in the peripheral portion of the rotary shear members. Clamps 93 are disposed between the outer clamping plates 90 and the nuts 94 on the bolts 91. This arrangement maintains the shear elements 88 rigidly in the desired position and transmits the shearing forces directly to the rotary shear members. A difference is to be noted between the shear elements 88 and 88'. The former are annular extending unbroken about the periphery of the shear member 15 while the latter are separate with their cutting edges spaced circumferentially of the shear member 16 to provide the intact portions between the slits in the sheared structural member. The shear elements 88' may progressively vary in length to produce corresponding slits in the structural member.

Figure 15:
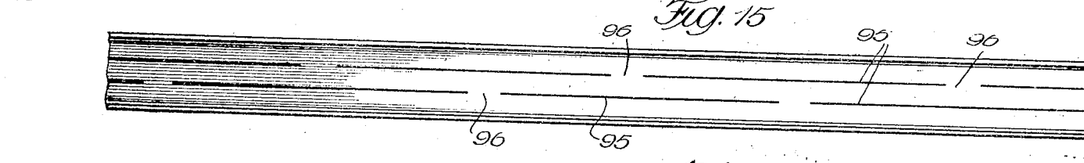
Fig. 15 is a plan view of a portion of a structural member after the shearing operation.
Figure 16:
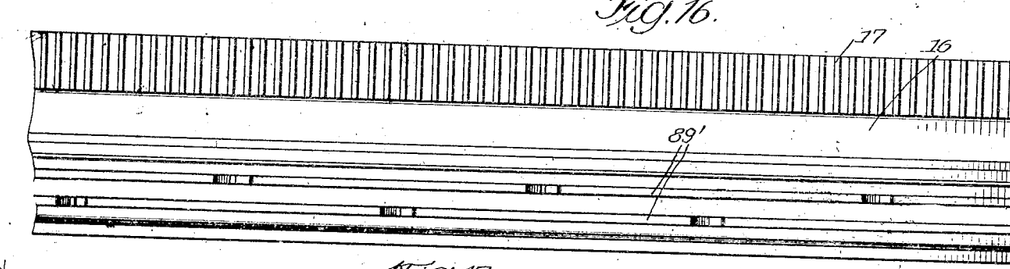
Fig. 16 is a development of the face of the lower shear member.
Figure 17:
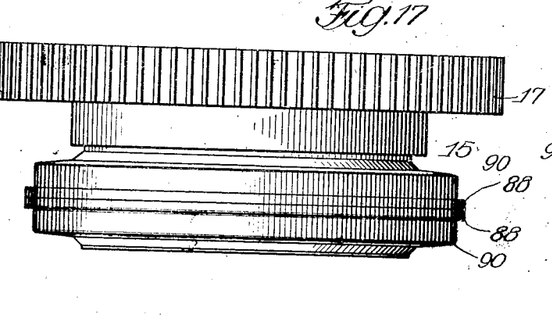
Fig. 17 is a plan view of the upper shear member.

In carrying out the desired object of shearing structural members which are to be subsequently expanded to provide integral truss structures it is necessary to provide for cutting a plurality of lines of slits 95 (Fig. 15) in the web of the member, the slits being spaced longitudinally and staggered so that intact portions 96 appear in similar relation throughout the entire length of the sheared member. The shear elements 88' on the lower rotary shear member 16 are, therefore, separated by filler blocks 97 (Fig. 13) so that the inner faces of the shear elements 88' are substantially in the plane of the outer faces of the shear elements 88 on the upper rotary shear member 15, the latter shear elements being disposed in abutting relation. This arrangement has an advantage in that the lateral forces which normally would tend to separate the opposed shear elements when pressure is exerted thereon are neutralized or balanced and hence I am able to shear cleanly material of considerable thickness without danger of distorting the metal or breaking the shear elements. As has previously been stated it is necessary that the slits 95 be staggered and accordingly the shear elements 88' are arranged in staggered relation on the lower rotary shear member 16, as will be readily understood by reference to Fig. 16. The shear elements 88 on the upper rotary shear member 15 present continuous shearing edges to the upper face of the structural member 27 as it passes between the shear members.

Figure 18:
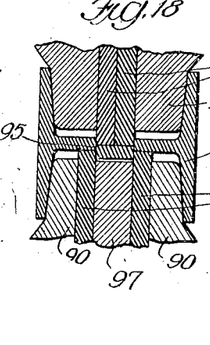
Fig. 18 is a section on the line 18—18 of Fig. 14.
Figure 19:
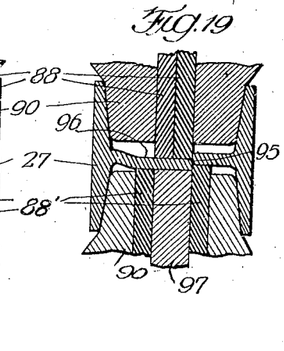
Fig. 19 is a section on the line 19—19 of Fig. 14.

The mode of operation of my invention should be apparent from the following brief description thereof. A flanged structural member 27 to be sheared is disposed upon the support 25 and the foot pedal 76 is depressed to move the bar 71 to the position indicated in Fig. 7, where it remains until the rotary shear member 16 has revolved to engage the cam 85 thereon with the wear block 84 on the bar 71. The bar is depressed in the manner previously described to cause the latch 68 to disengage the clutch lever 58, thus permitting the clutch 57 to engage the clutch teeth 66 and start the feed mechanism. The structural member 27 is thus moved into the bite between the shear elements 88 and 88' on the rotary shear members. As the structural member 27 advances the opposed shear elements shear and displace the metal as indicated in Figs. 18 and 19, Fig. 18 illustrating the action at a point where the slits 95 overlap and Fig. 19 illustrating the action at one of the intact portions 96. The structural member 27 continues to advance until it engages the rolls 39 and 40, which serve to return the displaced metal to its normal plane, so that when the operation is completed and the structural member 27 rests upon the rollers 53, the web of the structural member 27 will present its normal flat appearance but with the staggered slits 95 therein.

In carrying out the practical application of my invention I have discovered that it is not practicable to so arrange the shear elements 88 and 88' that they meet during the shearing operation as has heretofore been the common practice in the operation of shears for the reason that the displacement of the metal would be so great as to strain the intact portions 96 to an extent which would either rupture the metal or so weaken it that it is useless. I have discovered, however, that in treating non-fibrous material, such as steel, it is possible to shear cleanly through the metal without causing the shear elements to meet, it being sufficient in fact for the shear elements to approach each other as closely as one-half of the thickness of the metal to be sheared. I have therefore, arranged the rotary shear members 15 and 16 so that the opposed shear elements 88 and 88' thereon are spaced in a line connecting the centers of the rotary shear members a distance equal to approximately one-half of the thickness of the metal which the machine is designed to treat.

Under this condition the displacement of the metal during the shearing operation is not sufficient to in any way endanger the intact portions 96 but owing, as before stated, to the non-fibrous nature of the material the metal is cleanly sheared and the slits 95 are formed without the necessity of causing the shear elements 88 and 88' to meet. The rolls 39 and 40 have an additional function in this connection. Should the shear elements 88 and 88' fail to break all of the fibers during the shearing operation, the doubling back of the fibers as the metal passes between the rolls 39 and 40 will insure that the fibers are broken so that by no possibility can a structural member 27 leave the machine with the portions which should be slitted intact.

From the foregoing it will be apparent that I have perfected a machine which presents numerous features of novelty over the prior art and which is peculiarly adapted to perform a desired function in a novel and extremely desirable manner and with sufficient rapidity to meet the commercial conditions which surround the treatment of metallic structural members for the purposes for which expanded truss structures are adapted.

It will be further apparent that various changes may be made in the form, construction and arrangement of the parts without departing from the spirit and scope of the invention or sacrificing any of its material advantages, the form hereinbefore described being merely a preferred embodiment thereof.

I claim:

1. A rotary shear comprising a support, a pair of opposed coöperating rotary shear members mounted thereon, means for continuously rotating said members, mechanism for feeding material to said shear members, and means under control of one of said members for intermittently actuating said mechanism.

2. A rotary shear comprising a support, a pair of opposed coöperating rotary shear members mounted thereon, means for continuously rotating said members, mechanism for feeding material to said shear members, means under control of one of said members for intermittently actuating said mechanism, and means controllable by the operator for initiating the operation of said actuating means.

3. A rotary shear comprising a support, a pair of opposed coöperating rotary shear members mounted thereon, means for continuously rotating said members, mechanism for feeding material to said shear members, and means jointly controllable by the operator and by one of said shear members for intermittently actuating said mechanism in synchronism with said shear members.

4. A rotary shear comprising a support, a pair of rotary shear members mounted thereon, means for continuously rotating said members, mechanism for feeding material to said shear members, means jointly controllable by the operator and by one of said shear members for intermittently actuating said mechanism in synchronism with said shear members, and means for automatically stopping actuation of said mechanism at the conclusion of each shearing operation.

5. A rotary shear comprising a support, a pair of opposed coöperating rotary shear members mounted thereon, a source of power, means permanently connecting said source of power and shear members, whereby the latter are continuously driven, mechanism for feeding material to said shear members, and means controllable jointly by the operator and by said shear members for intermittently actuating said feed mechanism in synchronism with said shear members.

6. A rotary shear comprising a support, a pair of rotary shear members mounted thereon, a source of power, means for driving said shear members continuously from said source of power, mechanism for feeding material to said shear members, means controllable jointly by the operator and by said shear members to connect said mechanism to said source of power, and means to automatically disconnect said mechanism from said source of power at the conclusion of each shearing operation.

7. A rotary shear comprising a support, a pair of rotary shear members mounted thereon, means for continuously rotating said members, mechanism for feeding material to said shear members, means under control of one of said members for intermittently actuating said mechanism, means controllable by the operator initiating the operation of said actuating means, and means to prevent actuation of said mechanism while material remains in the machine.

8. A rotary shear comprising a support, a pair of rotary shear members mounted thereon, a source of power, means for driving said shear members continuously from said source of power, mechanism for feeding material to said shear members, means controllable jointly by the operator and by said shear members to connect said mechanism to said source of power, means to automatically disconnect said mechanism from said source of power at the conclusion of each shearing operation, and means to prevent actuation of said mechanism while material remains in the machine.

9. A rotary shear comprising a support, a pair of opposed coöperating rotary shear members mounted thereon, a source of power, a continuous driving connection between said source of power and shear members, mechanism for feeding material to said shear members, a driving connection between said source of power and mechanism, and means controllable jointly by the operator and by said shear members to make and break the latter driving connection.

10. A rotary shear comprising a support, a pair of rotary shear members mounted thereon, a source of power, a continuous driving connection between said source of power and shear members, mechanism for feeding material to said shear members, means controllable jointly by the operator and by said shear members to intermittently connect said mechanism to the source of power in synchronism with said shear members, and means for breaking the driving connection to said mechanism at the conclusion of each shearing operation.

11. A rotary shear comprising a support, a pair of rotary shear members mounted thereon in coöperating relation, one of said members being of relatively large diameter and having a plurality of circumferentially and transversely spaced shear elements on its periphery and the other member being of relatively small diameter and having circumferentially continuous shear elements on its periphery arranged back to back with their outer faces substantially in the plane of the inner faces of the circumferentially spaced shear elements.

12. A rotary shear comprising a support, a pair of rotary shear members mounted thereon in coöperating relation, one of said members having a plurality of circumferentially spaced shear elements secured to its periphery and the other member having circumferentially continuous shear elements on its periphery, the shear elements on one of said members being arranged in abutting relation and the shear elements on the other member being spaced transversely of said member so that their inner faces are substantially in the planes of the outer faces of the coöperating shear elements.

13. A rotary shear comprising a support, a pair of rotary shear members mounted thereon and operatively connected to rotate at the same peripheral speed, a plurality of circumferentially spaced shear elements on one of said members, circumferentially continuous shear elements on the other member, means for rotating said members, mechanism for feeding material to said members, means for intermittently actuating said mechanism and means for automatically stopping said mechanism at the conclusion of each feeding operation.

14. A rotary shear comprising a support, a pair of rotary shear members mounted thereon and operatively connected to rotate at the same peripheral speed, a plurality of circumferentially spaced shear elements on one of said members, circumferentially continuous shear elements on the other member, means for rotating said members, mechanism for feeding material to said members, and means controllable jointly by the operator and by said members for intermittently actuating said mechanism in synchronism with said member.

15. A rotary shear comprising a support, a pair of opposed coöperating rotary shear members mounted thereon, a source of power, means permanently connecting said source of power and shear members, whereby the latter are continuously driven, mechanism for feeding material to said shear members, means under control of one of said members for intermittently actuating said feed mechanism from said source of power and means controllable by the operator for initiating the operation of said actuating means.

16. A rotary shear comprising a support, a pair of opposed coöperating rotary shear members mounted thereon and operatively connected to rotate at the same peripheral speed, a plurality of circumferentially spaced shear elements on one of said members, and circumferentially continuous shear elements on the other member, means for rotating said members, mechanism for feeding material to said members, means under control of one of said members for intermittently actuating said mechanism, and means controllable by the operator for initiating the operation of said actuating means.

17. A rotary shear comprising a support, a pair of rotary shear members mounted thereon and operatively connected to rotate at the same peripheral speed, a plurality of circumferentially spaced shear elements on one of said members, circumferentially continuous shear elements on the other member, means for rotating said members, mechanism for feeding material to said members, means controllable jointly by the operator and by said members for intermittently actuating said mechanism in synchronism with said member, and means to prevent actuation of said mechanism while material remains in the machine.

ALBERT J. BATES.

Witnesses:
M. A. KIDDIE,
ERNEST H. MERCHANT.